(12) United States Patent
Yang

(10) Patent No.: US 6,719,273 B1
(45) Date of Patent: Apr. 13, 2004

(54) WATER OUTLET VALVE FOR WATER BAG MOUTHPIECE

(76) Inventor: Shih-Sheng Yang, PO Box 82-144, Taipei (TW)

( * ) Notice: Subject to any disclaimer, the term of this patent is extended or adjusted under 35 U.S.C. 154(b) by 0 days.

(21) Appl. No.: 10/377,645

(22) Filed: Mar. 4, 2003

(51) Int. Cl.$^7$ .............................................. F16K 31/00
(52) U.S. Cl. ........................ 251/341; 251/344; 222/175
(58) Field of Search ................................ 222/175, 525; 251/341, 342, 343, 344, 348; 220/714; 224/148.2; 137/844, 847

(56) References Cited

U.S. PATENT DOCUMENTS

| | | | | |
|---|---|---|---|---|
| 4,714,200 A | * | 12/1987 | Sayama | 239/579 |
| 4,824,075 A | * | 4/1989 | Holzboog | 251/349 |
| 5,911,406 A | * | 6/1999 | Winefordner et al. | 251/339 |
| 5,971,357 A | * | 10/1999 | Denton et al. | 251/144 |

* cited by examiner

Primary Examiner—Edward K. Look
Assistant Examiner—John K. Fristoe, Jr.
(74) Attorney, Agent, or Firm—Leong C. Lei

(57) ABSTRACT

An improved water outlet valve structure of a water bag mouthpiece, which includes: a nozzle which is composed of a supporting frame and a soft suction portion wrapping around the supporting frame; a threaded base which has a base, a threaded connecting section extended from one end of the base, and a connecting section extended from the other end of the base; an extended section coupled to the connecting section and disposed on one end of said mouthpiece; a sleeve with notches provided around its periphery; an annular section disposed in said sleeve; and a receiving section which is mounted in-between said connecting section and said extended section of the threaded connecting section. By means of the above structures, a user can easily operate the functions of water releasing and water stopping via the mouthpiece of the water bag and the present invention can be securely fixed to the duct of the water bag for the user's convenience.

2 Claims, 6 Drawing Sheets

WATER OUTLET VALVE FOR WATER BAG MOUTHPIECE

BACKGROUND OF THE INVENTION

1. Field of the Invention

The present invention relates to an improved water outlet valve for a water bag mouthpiece, more particularly to a water outlet valve for a water bag mouthpiece which has the functions of water releasing and water stopping, and can be secured onto a duct of the water bag for the user's convenience.

2. Description of the Related Art

A prior-art "Soft type mouthpiece with water releasing and water stopping functions" of U.S. Pat. No. 6,085,947 is a soft type mouthpiece, comprising: a soft type mouthpiece having a water outlet at a front end, and a toothed tube portion at a rear end; a positioning seat having a toothed tube portion internally provided with an internal channel of a smaller diameter at one end, and a sectioned portion of a larger diameter, said sectioned portion having an inner wall provided with a leakage-proof flange and a depressed groove, said rear end of said mouthpiece being insertably secured on said toothed tube of said positioning seat; and a slidable sleeve having a ratchet tooth tube at one end, and an annular tube at the other end that can insert into said sectioned portion of said positioning seat, said annular tube having an annular wall provided with a positioning flange, a suitably indented slide groove at a rear end of said positioning flange, and an urging post at the center of a front end of said annular tube, the periphery of said urging post being hollowed out to form water slots; whereby said sidable sleeve is inserted into said sectioned portion of said positioning seat such that said urging post closes a gate, with said leakage-proof flange of said positioning seat retained in said slide groove of said sidable sleeve, said positioning flange of said slidable sleeve being retained in said depressed groove of said positioning seat as well, thereby changing the relative position of said positioning seat and said slidable sleeve to achieve water release or water stopping.

Although the aforementioned "Soft type mouthpiece with water releasing and water stopping functions" can improve the prior-art "mouthpiece structure of sports water bag", its operation still requires the user to suck or bite the soft sucking head since the sucking head is a soft type mouthpiece. Therefore, it requires a larger force from the user to bite the mouthpiece for the use, and the above prior-art structure still needs to be improved.

SUMMARY OF THE INVENTION

The primary objective of the present invention is to provide an easy-to-use water outlet valve for the users to achieve the purpose of releasing water and stopping water in the water bag.

Another objective of the present invention is to provide a water outlet valve that can be secured onto the duct of the water bag to achieve the purpose of its convenient use.

According to a preferred embodiment of the present invention, an improved water outlet valve for water bag mouthpiece, comprises:

a threaded base, disposed at one end of a mouthpiece, said threaded base comprising a base, a threaded connecting section extended from one side of said base, a connecting section extended from another side of said base, and an extended section coupled to said connecting section, such that said threaded connecting section being fixed to a sleeve by threads, and said connecting section at its outer side comprising at least two latch members, and said extended section at a predetermined position having at least one penetrating hole, and said threaded base comprising a through connecting section, a base, a connecting section, and an extended section corresponding to the hole of said penetrating hole, and a barrier being disposed at a predetermined position on the inner side of said extended section proximate the penetrating hole to define a recession section, so that the hole on the threaded base being only connected to the penetrating hole of said extended section without passing through the threaded base;

a sleeve, sheathed onto the connecting section and extended section of said threaded base, and said sleeve comprising a sleeve, said sleeve at one end having a connecting section connectable to a duct of a water bag, and a notch being disposed on the periphery of said sleeve to couple the latch member of said connecting section, and the notch of said sleeve being larger than latch member of said connecting section, so that said latch member being capable of sliding in the notch, and an annular section being disposed at a position inside said sleeve proximate said connecting section, and said section being disposed inside the recession section of said threaded base, and said sleeve having a penetrating hole thereon; and such arrangement providing users an easy way for operating and controlling the water releasing and water stopping functions.

To make it easier for our examiner to understand the objective of the invention, its structure, innovative features, and performance, we use a preferred embodiment together with the attached drawings for the detailed description of the invention.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE PREFERRED EMBODIMENT

Figure 1:
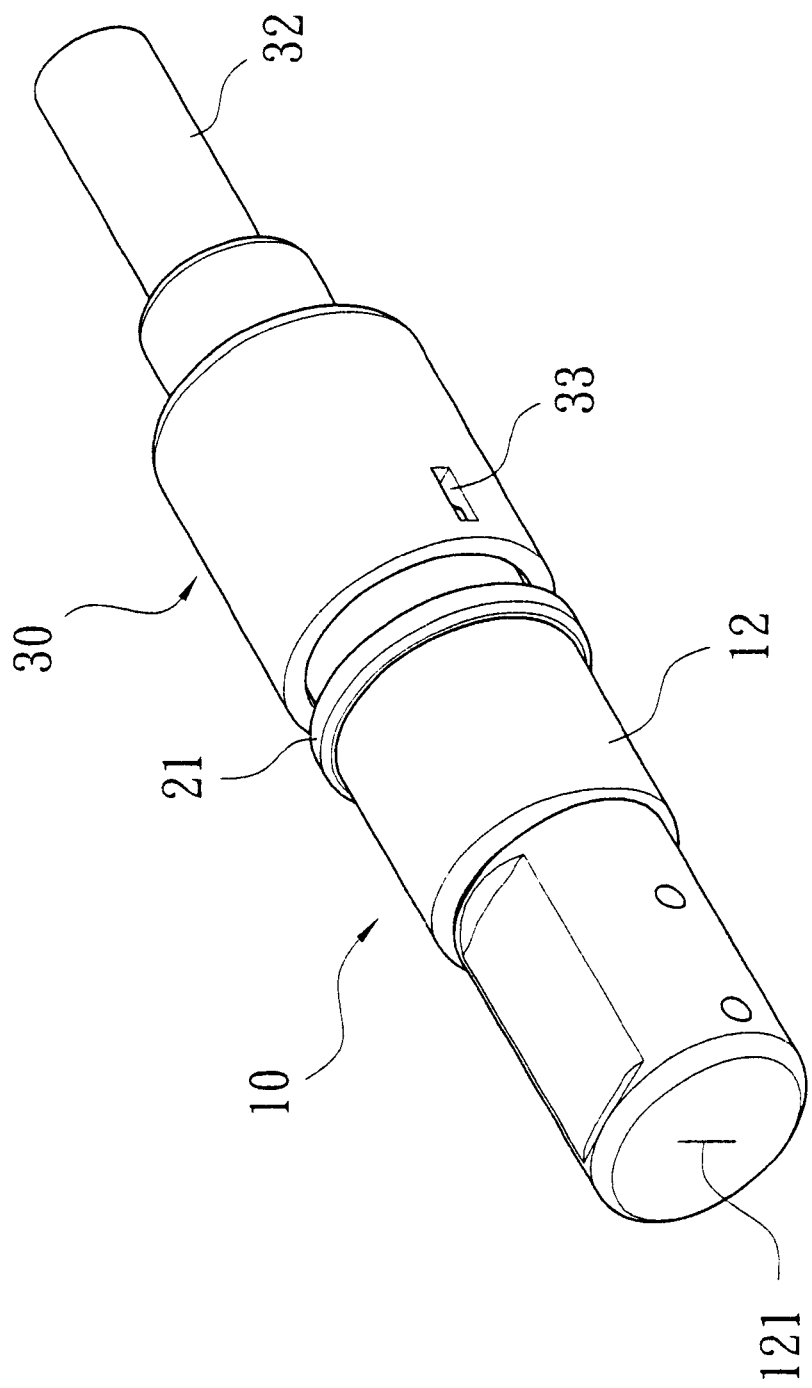
FIG. 1 is a perspective view of the water outlet valve according to the present invention.
Figure 2:
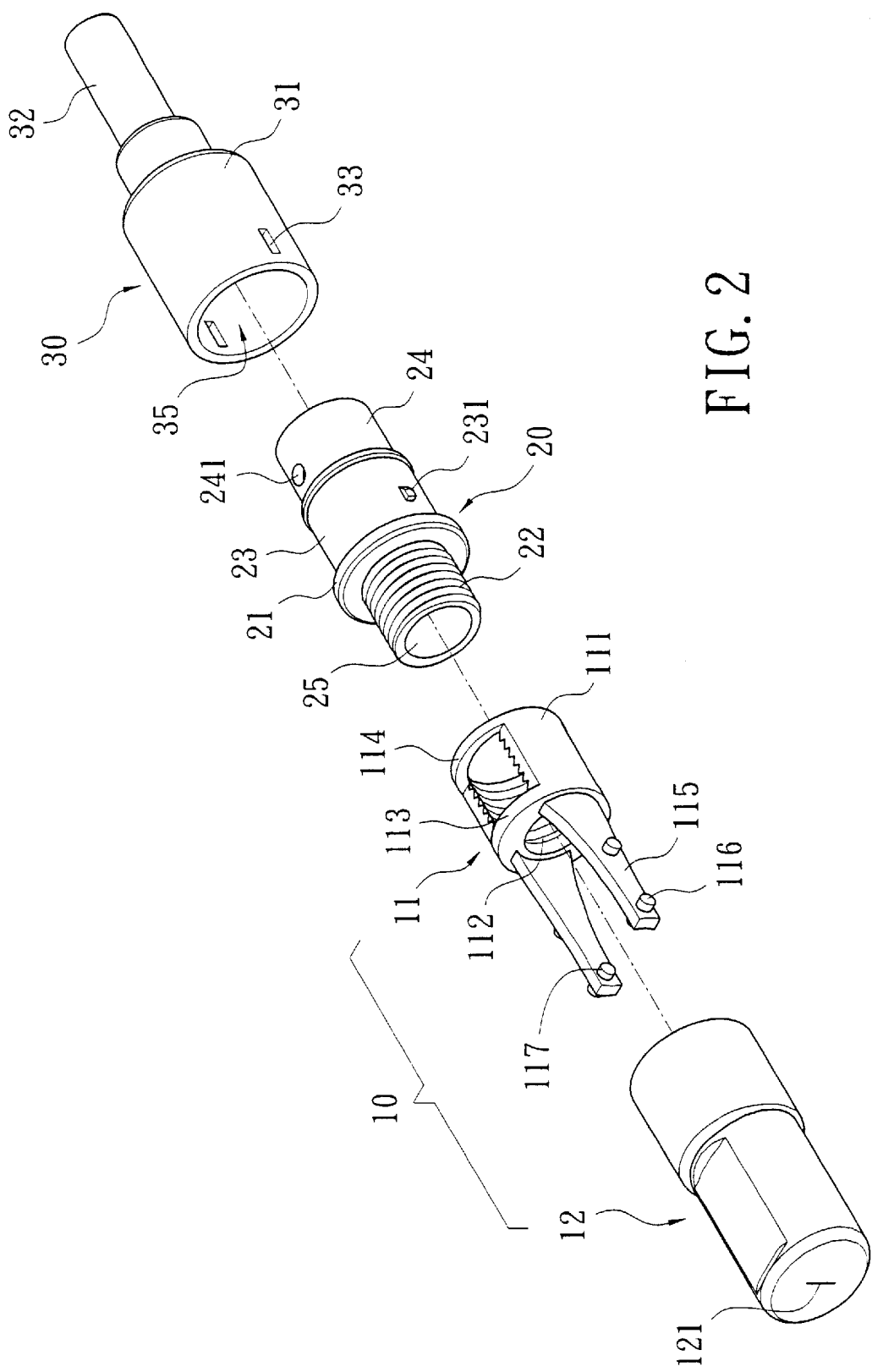
FIG. 2 is a perspective exploded view of the water outlet valve according to the present invention.
Figure 3:
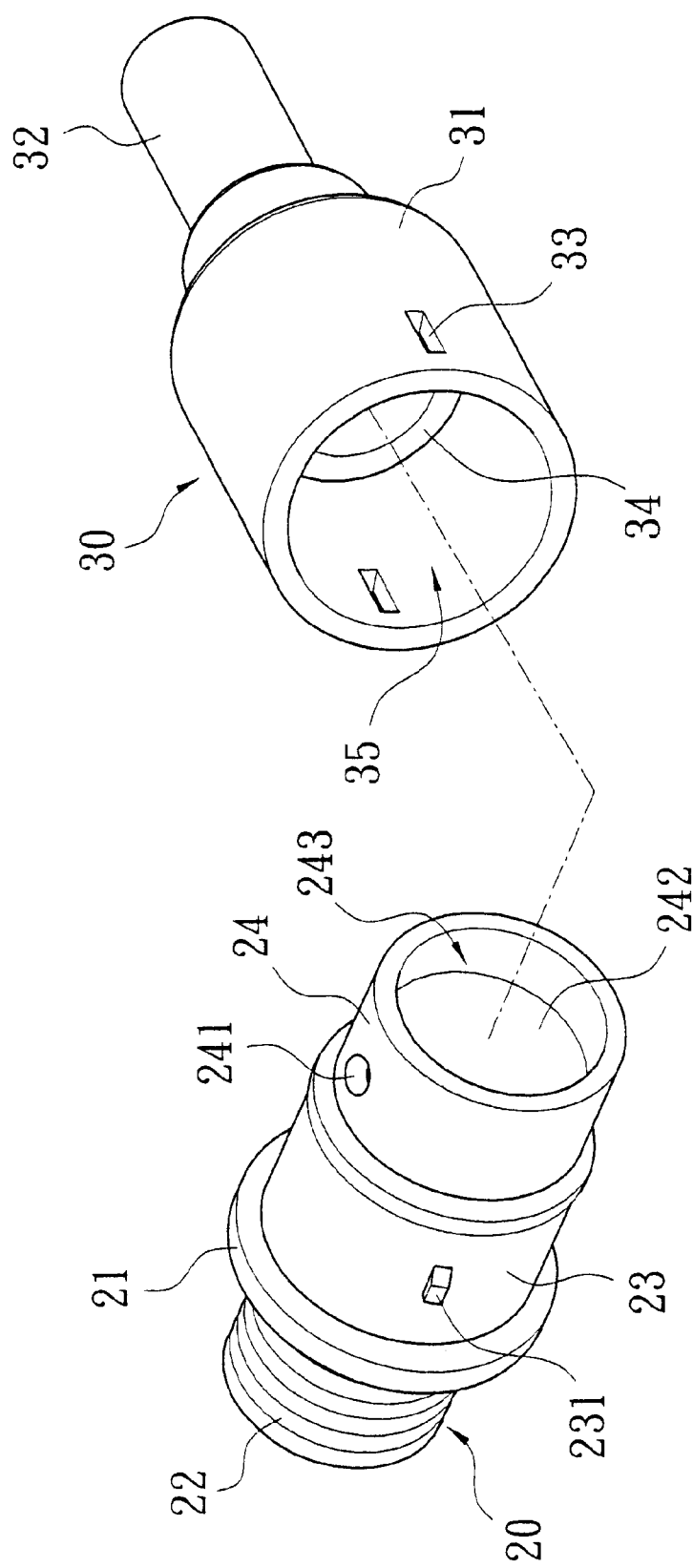
FIG. 3 is another perspective exploded view of the water outlet valve according to the present invention.

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Please refer to the FIGS. 1 to 4 respectively for the perspective view, the perspective exploded view, another perspective exploded view, and the cross-sectional view of the water outlet valve according to the present invention. In the figures, the present invention is an improved mouthpiece of water bags, being comprised of a mouthpiece 10, a threaded base 20, and a connecting section 30; by means of the foregoing structure, a user can suck the mouthpiece 10 more easily to achieve the functions of releasing water and stopping water in the water bag, and also can fix the mouthpiece 10 more securely onto a duct 41 of a water bag 40 to attain the purpose of its convenient use.

Said mouthpiece 10 is comprised of a supporting frame 11 and a soft suction portion 12 wrapped around the exterior of the supporting frame 11; said supporting frame 11 comprises a threaded sleeve cylinder 111; said sleeve cylinder 111 at its middle has a penetrating hole 112; both ends of said sleeve cylinder 111 respectively have a fixed ring 113 and a threaded connecting ring 114, and two stands 115 are extended from the end having the fixed ring 113 and proximate the penetrating hole 112; the stand 115 is slightly opened outward, and the stand 115 respectively has a protruded member 116 at its outer side and a protruded member 117 at its inner side. The soft suction portion 12 at one side has a slit 121, and the soft suction portion 12 is wrapped around the exterior of the supporting frame 11 by plastic injection; the stand 115 at the mold post props the protruded member 117, such that when the protruded member is slightly opened, the protruded member 116 at the outer side presses against the inside of the mold. Further, plastic injection technology is applied to wrap the soft plastic material around the outside of the sleeve cylinder 11. When such process is completed, the mold post is withdrawn, so that the slit 121 has a closed end feature.

The threaded base 20 is disposed at one end of said mouthpiece 10, and said threaded base 20 comprises a base 21, a threaded connecting section 22 extended from one end of the base 21, a connecting section 23 extended from another side of the base 21, and an extended section 24 coupled to the connecting section 23. Such connecting section 23 and the extended section at their outer diameter have a difference in height, and by means of driving the threaded connecting section 22 into the sleeve cylinder 111, the outer side of the connecting section 23 comprises at least two latch members 231. The extended section 24 at a predetermined position has at least one penetrating hole 241, and the threaded base 20 comprises a penetrating threaded connecting section 22, a base 21, a connecting section 23, and an extended section 24 is corresponding to the hole 25 of the penetrating hole 112. A barrier 242 is disposed at a predetermined position on the inner side of the extended section 24 next to the penetrating hole 241 in order to form a recession section 243, such that the hole 25 of the threaded base 20 only connects to the penetrating hole 241 of the extended section 24, and does not pass through the threaded base 20. The connecting section 30 sheathes on the connecting section 23 and the extended section 24 of the threaded base 20, and the connecting section 30 comprises a sleeve 31, and a pipe connecting section 32 is disposed on one end of the sleeve 31 for connecting to the duct 41 of the water bag 40, and a notch 33 is disposed on the periphery of the sleeve 31 to latch a latch member 231 of the connecting section 23 such that the latch member 231 can slide in the notch 33. An annular section 34 is disposed at a position inside the sleeve 31, and the annular section 34 is disposed on the recession section 243 of the threaded base 20. The connecting section 30 has a penetrating hole 35, so that the above structure constitutes a novel improved mouthpiece of water bags.

Figure 4:
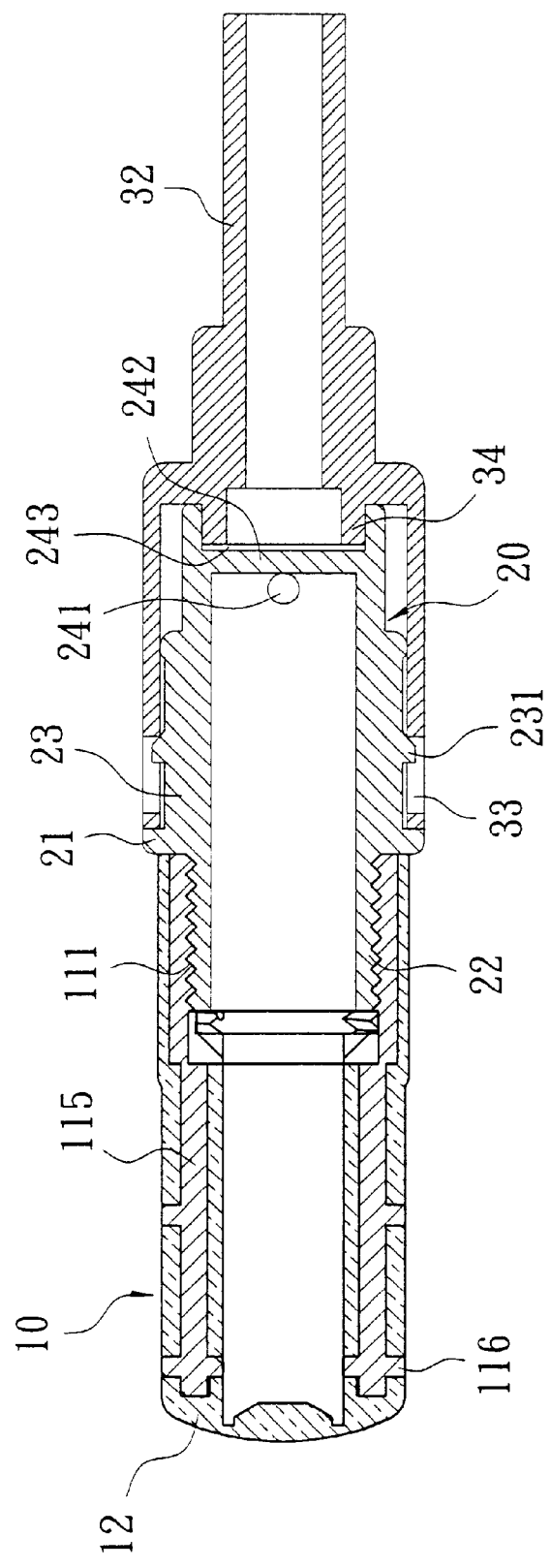
FIG. 4 is a cross-sectional view of the water outlet valve according to the present invention.
Figure 5:
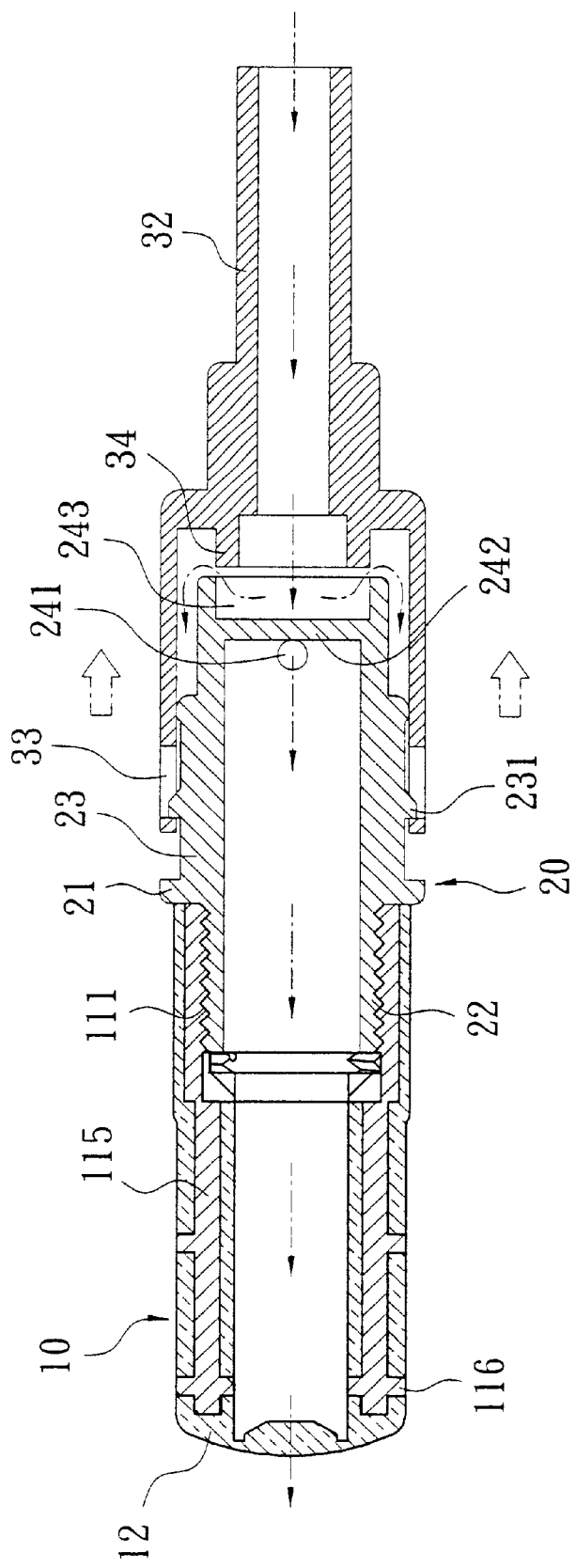
FIG. 5 is a cross-sectional view of the water outlet valve according to the present invention when it is in the water flowing state.
Figure 6:
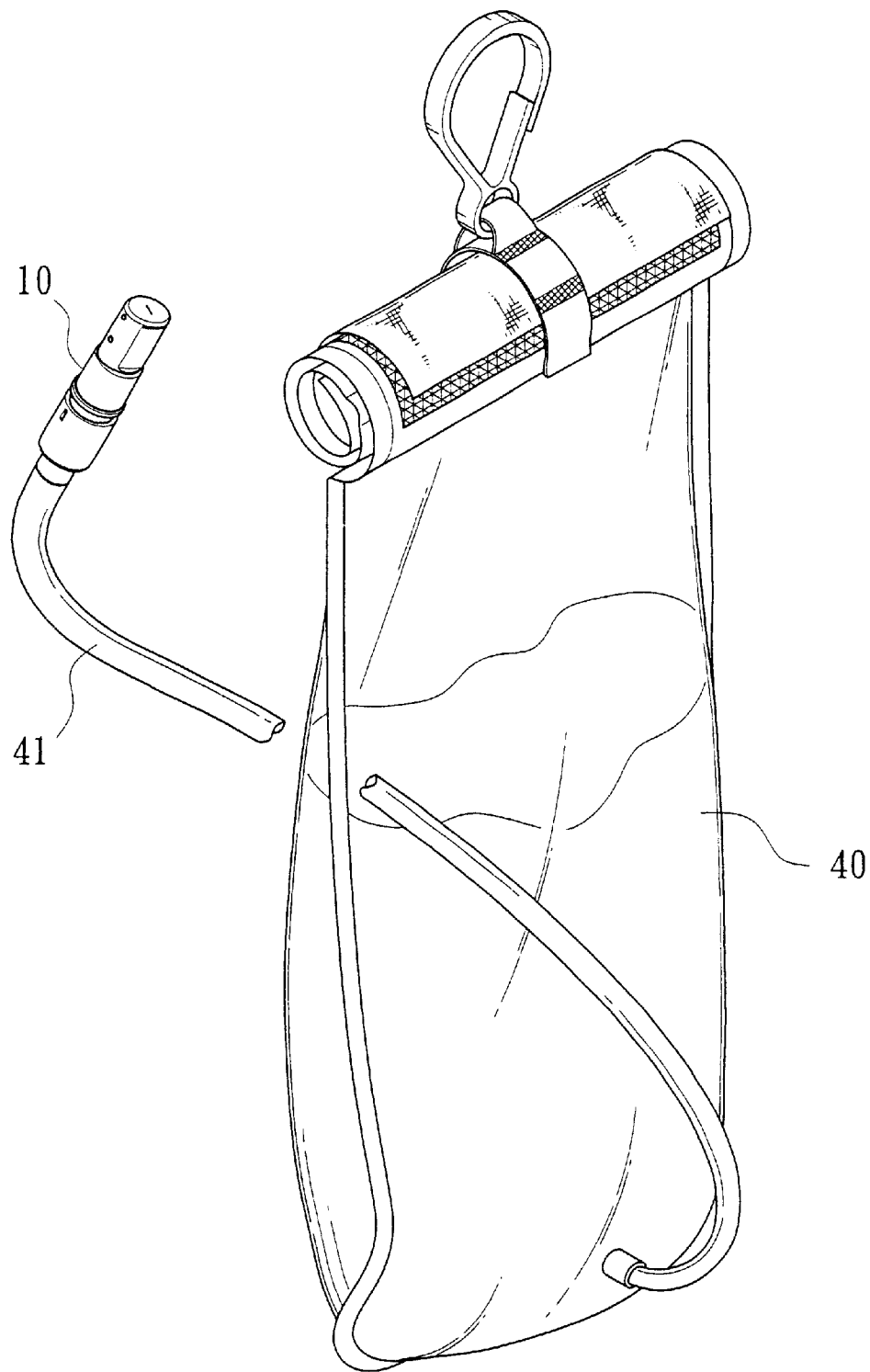
FIG. 6 is a schematic view illustrating the use of the water bag according to the present invention.

Please refer to FIGS. 4, 5, and 6 for the cross-sectional view of the present invention, cross-sectional view of the present invention when it is in water flowing state, and the schematic view illustrating the use of the water bag respectively. In the figures, the user only needs to pull out the mouthpiece 10 for use, and since the threaded base 20 is secured with the mouthpiece 10 by threaded connection, when the threaded base 20 is pulled out, the threaded base will slide into the notch 33 of the sleeve 31 by the latch member 231 of the connecting section 23, and separate the recession section 243 of the annular section 34 originally sheathed into one end of the threaded base 20, and further connect the penetrating hole 112, threaded base 20, the penetrating hole 241 of the extended section 24, the penetrating hole 25, and the penetrating hole 35 of the connecting section 30. At that time, the user only gently bites a sucking section 12 of the mouthpiece 10, so that the stand 115 at one end of the supporting frame 11 will open up the slit 121 to start the sucking, and the water in the water bag 40 along the duct 41will be sucked out, and pass into the user's mouth through the penetrating hole 112 of the mouthpiece 19, the threaded section 20, the hole 25 connecting to the penetrating hole 241 of the extended section 24, and the penetrating hole 35 on the connecting section 30. After the drinking is completed, the sucking section 12 is released, and the supporting frame 11 with the property of its stand 115 at one end will close the slit 121 and push the mouthpiece 10 back, so that the recession section 243 at one end of the separated threaded base 20 is sheathed into the annular section 34 again by means of sliding the latch member 231 of the connecting section 23 in the notch 33 of the sleeve 31. The water is stopped when the penetrating hole 112, the penetrating hole 25 connected to the penetrating hole 241 of the extended section on the threaded base 20, and the penetrating hole 35 on the connecting section 30 are in closed state. Such arrangement can improve the shortcomings of the prior art and allow users to use the mouthpiece easily for releasing and stopping the water in the water bag 40, and fix the mouthpiece according to the present invention onto the duct 41 of the water bag 40 more securely, and attain the purpose of its convenient use.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An improved water outlet valve for water bag mouthpiece, comprising:

a threaded base which is disposed at one end of the mouthpiece and comprises a base, a threaded connecting section extended from one side of said base, a connecting section extended from another side of said base, and an extended section coupled to said connecting section such that said threaded connecting section can be fixed to a sleeve by threaded connection; while at least two latch members are provided on the outer side of said connecting section, and at least one penetrating hole is provided on said extended section at a predetermined position; said threaded base comprises a threaded connecting section, a base, a connecting section, and an extended section corresponding to the hole of said penetrating hole; and a barrier being disposed at a predetermined position on the inner side of said extended section proximate the penetrating hole to define a recession section, so that the hole on the threaded base is only connected to the penetrating hole of said extended section without passing through the threaded base;

a sleeve, mounted in-between the connecting section and extended section of said threaded base; said sleeve comprises a sleeve one end of which has a connecting section connectable to a duct of a water bag, and a notch is disposed on the periphery of said sleeve to couple the latch member of said connecting section, and the notch of said sleeve being larger than latch member of said connecting section, so that said latch member being capable of sliding in the notch, and an annular section being disposed at a position inside said sleeve proximate said connecting section, and said section being disposed inside the recession section of said threaded base, and said sleeve having a penetrating hole thereon; and such arrangement is used to control the water releasing and water stopping functions.

2. The improved water outlet valve for water bag mouthpiece of claim 1, further comprising a mouthpiece which is comprised of a supporting frame and a soft suction portion wrapped around the exterior of said supporting frame, and said supporting frame comprising an internally threaded sleeve cylinder, and said sleeve cylinder having a penetrating hole, and a fixed ring and a threaded connecting ring on respectively on both ends thereof, and two stands being extended from one end of said fixed ring proximate the penetrating hole, said two stands being slightly opened outward, and a slit being disposed on one side of said soft suction portion.

* * * * *